United States Patent
Garg et al.

(10) Patent No.: US 9,229,760 B2
(45) Date of Patent: Jan. 5, 2016

(54) VIRTUAL MEMORY MANAGEMENT TO REDUCE POWER CONSUMPTION IN THE MEMORY

(71) Applicants: Ankita Garg, Banglalore (IN); Dipankar Sarrna, Bangalore (IN); Vaidyanathan Srinivasan, Bangalore (IN)

(72) Inventors: Ankita Garg, Banglalore (IN); Dipankar Sarrna, Bangalore (IN); Vaidyanathan Srinivasan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 13/674,286

(22) Filed: Nov. 12, 2012

(65) Prior Publication Data

US 2014/0137105 A1    May 15, 2014

(51) Int. Cl.
  *G06F 9/455*    (2006.01)
(52) U.S. Cl.
  CPC .. *G06F 9/45558* (2013.01); *G06F 2009/45583* (2013.01)
(58) Field of Classification Search
  CPC .................. G06F 9/45558; G06F 2009/45583; Y02B 60/146
  USPC .................................................. 718/1; 711/6
  See application file for complete search history.

(56) References Cited

U.S. PATENT DOCUMENTS

| | | | |
|---|---|---|---|
| 6,954,837 B2 | 10/2005 | Woo et al. | |
| 7,007,183 B2 | 2/2006 | Rawson, III | |
| 7,539,841 B2* | 5/2009 | Rawson, III | 711/202 |
| 7,788,461 B2* | 8/2010 | Rawson, III | 711/170 |
| 7,788,513 B2 | 8/2010 | Vaden et al. | |
| 8,245,060 B2* | 8/2012 | Worthington et al. | G06F 1/3225 713/300 |
| 2002/0161932 A1* | 10/2002 | Herger et al. | 709/321 |
| 2003/0061448 A1* | 3/2003 | Rawson, III | 711/133 |
| 2007/0005998 A1* | 1/2007 | Jain et al. | G06F 1/3225 713/300 |
| 2007/0011421 A1 | 1/2007 | Keller, Jr. et al. | |
| 2008/0313482 A1* | 12/2008 | Karlapalem et al. | G06F 12/023 713/324 |
| 2009/0113162 A1 | 4/2009 | Di-Zenzo | |
| 2009/0228882 A1* | 9/2009 | Wang et al. | G06F 9/5077 718/1 |
| 2010/0191929 A1* | 7/2010 | Rawson, III | 711/170 |
| 2010/0235669 A1* | 9/2010 | Miyamuko | 713/324 |
| 2011/0078361 A1* | 3/2011 | Chen et al. | G06F 12/145 711/6 |
| 2011/0138147 A1* | 6/2011 | Knowles et al. | 711/170 |
| 2012/0144144 A1* | 6/2012 | Worthington et al. | G06F 12/0223 711/165 |
| 2014/0136864 A1* | 5/2014 | Garg; Ankita | G06F 1/3275 713/320 |

OTHER PUBLICATIONS

Google definition of the terms Topology and Topography.*
MemScale: Active Low-Power Modes for Main Memory, Qingyuan Deng et al., ASPLOS'11, Mar. 5, 2011.
Virtual Machine Memory Access Tracing With Hypervisor Exclusive Cache, Pin Lu et al., URL: http:/www.vmware.com/files/pdf/usenix07.pdf.
vPnP: Automated Coordination of Power and Performance in Virtualized Datacenters, Jiayu Gong et al., Quality of Science 2010 Int. Workshop Jun. 16, 2010.

* cited by examiner

Primary Examiner — Emerson Puente
Assistant Examiner — Willy W Huaracha
(74) Attorney, Agent, or Firm — J. B. Kraft; Steven L. Bennett

(57) ABSTRACT

Reducing virtual memory power consumption during idle states in virtual memory systems comprising tracking the topology of the system memory by the system hypervisor and operating system running on any selected virtual machine hosted by the system hypervisor. The idle states in the system memory are dynamically monitored and then the power consumption states in the system memory are dynamically reduced through the interaction of the hypervisor and the operation system running on the selected virtual machine.

18 Claims, 4 Drawing Sheets and memory activity is controlled by memory controller 19
VIRTUAL MEMORY MANAGEMENT TO REDUCE POWER CONSUMPTION IN THE MEMORY

TECHNICAL FIELD

The present invention is directed to memory used to implement virtual memory, and particularly to the reduction of power consumption in the virtual memory itself.

BACKGROUND OF PRIOR ART

Virtual memory is an abstract concept of memory that a computer system uses when it references memory. Virtual memory consists of the computer system's main memory (RAM), which at the present state of the art is DRAM, its file systems and paging space. At different points in time, a virtual memory address referenced by an application may be in any of these locations. The application does not need to know which location as the computer system's virtual memory manager (VMM) will transparently move blocks of data around as needed.

Power consumption has become a significant factor in the operational costs of computer data centers. The information systems industries have continuously sought to reduce power consumption in data processing equipment. In recent years, it has been appreciated that even operational virtual memory, energy, i.e. power consumption, will have a significant effect on power consumption costs. Consequently, conventional virtual memory controllers now have the capability of putting DRAM memory portions into lower power consumption modes during idle states. Such conventional powering down approaches have involved significant enhancement of memory controller structure. Such memory controller enhancements, while effective in smaller systems have been found to be impractical for current larger multicore virtual memory systems.

SUMMARY OF THE INVENTION

The present invention provides for reduction of memory power consumption without any significant memory controller enhancements. To this end, the invention provides for coaction between the hypervisor of the multicore multiple virtual machine system and the operating systems of any selected virtual machine. As will be hereinafter detailed, the invention requires knowledge and understanding of the topology by the virtual machine operating systems and by the hypervisor.

The present invention may be implemented by a method for reducing virtual memory power consumption during idle states in virtual memory systems comprising tracking the topology of the system memory by the system hypervisor and tracking the topology of the system memory by the operating system running on any selected virtual machine hosted by said system hypervisor. The idle states in the system memory are dynamically monitored and then the power consumption states in the system memory are dynamically reduced through the interaction of the hypervisor and the operating system running on the selected virtual machine.

According to one aspect of the invention, the topology of the system memory is tracked by the operating system running on a selected virtual machine and then, under control of this operating system, user processes are swapped out to free up memory pages in a power domain wherein a memory power domain is evacuated and the hypervisor is notified that the power domain is evacuated, so that the hypervisor may reduce power consumption of the power domain to a reduced state that may be a totally inactive state.

It should be understood that the topology of the system memory may be tracked by all of the operating systems running on a plurality virtual machines and then one of said virtual machine operating systems may be selected to control the evacuating and notify the hypervisor.

In accordance with another aspect of present invention, the topology of the system memory is tracked by the hypervisor and further includes, under control of the hypervisor that notifies the operating system of the selected virtual machine of the user processes to be swapped out or reclaimed to free up memory pages in a power domain to evacuate a memory power domain and reduces power consumption of the power domain to a reduced state.

Another aspect of the present invention involves the use of a user space governor in a virtual machine operating system to dynamically control the power consumption levels at which specific actions are taken in the evacuation of power domains. The user space governor sets a maximum power consumption level below which a user space governor reduces the power consumption state only in power domains that automatically become evacuated during system operation, and above which power consumption level, said user space governor seeks user processes that may be swapped out or reclaimed to evacuate power domains.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
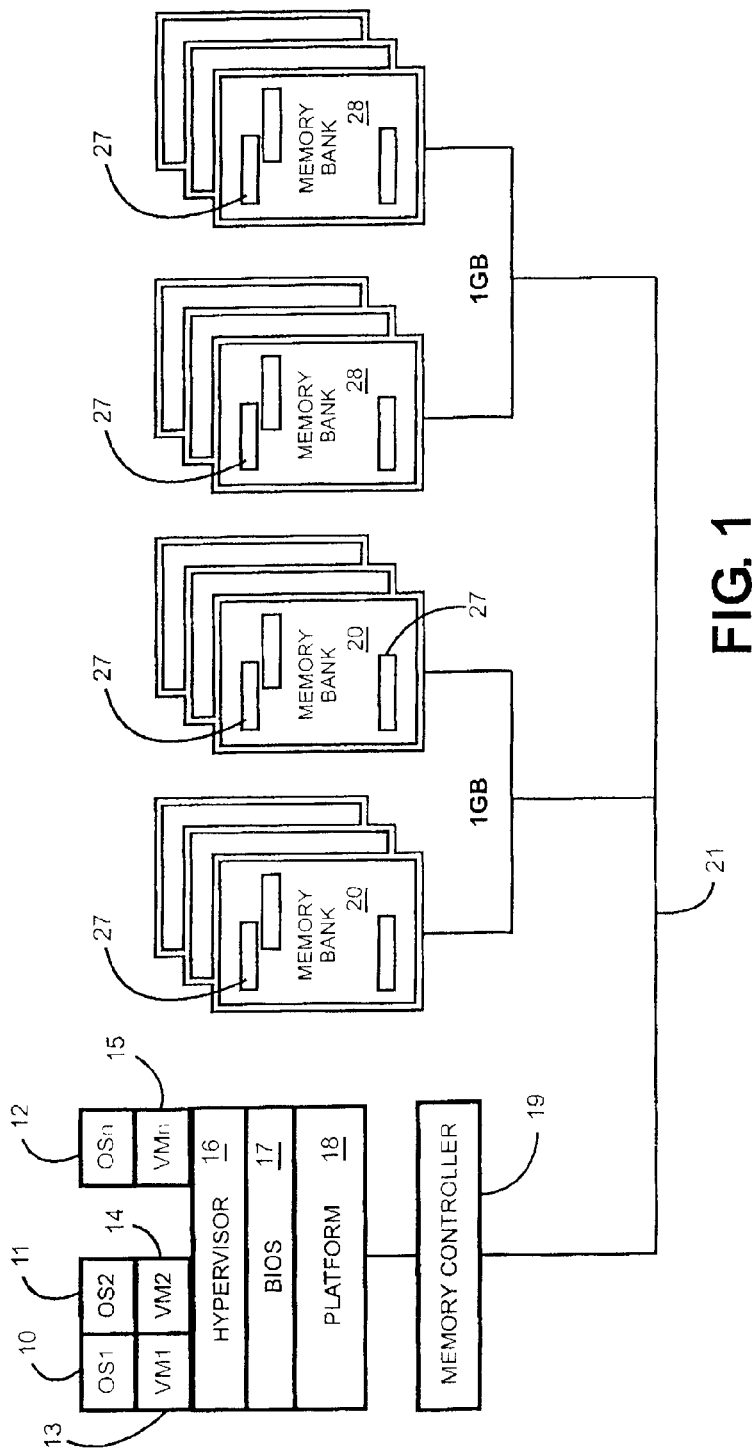
FIG. 1 is a block diagram of a generalized portion of a virtual memory system according to the present art state showing a multicore virtual machine platform connected to virtual memory through a memory controller.

Referring to FIG. 1, there is shown a generalized portion of a virtual memory system according to the present art state showing a multi-core virtual machine platform connected to virtual memory through a memory controller. Platform 18, supports Hypervisor 16 with its BIOS 17 to control Virtual Machines VM1 13, VM2 14, and VMn 15 which have their respective Operating OS1 10, OS2 11, and OSn 12. The I/O and memory activity is controlled by memory controller 19 connected, by bus 21 to a set of memory banks 20 with stored pages 27 which are in the active state, which are in an active state. Also connected to controller 19 are an illustrative memory banks 28, also with stored pages 27 but banks 28 are in an inactive and lower power state as indicated by shading. However, in this conventional virtual memory system, the state of the memory banks, memory I/O and distribution within the memory banks is controlled primarily by memory controller 19.

Figure 2:
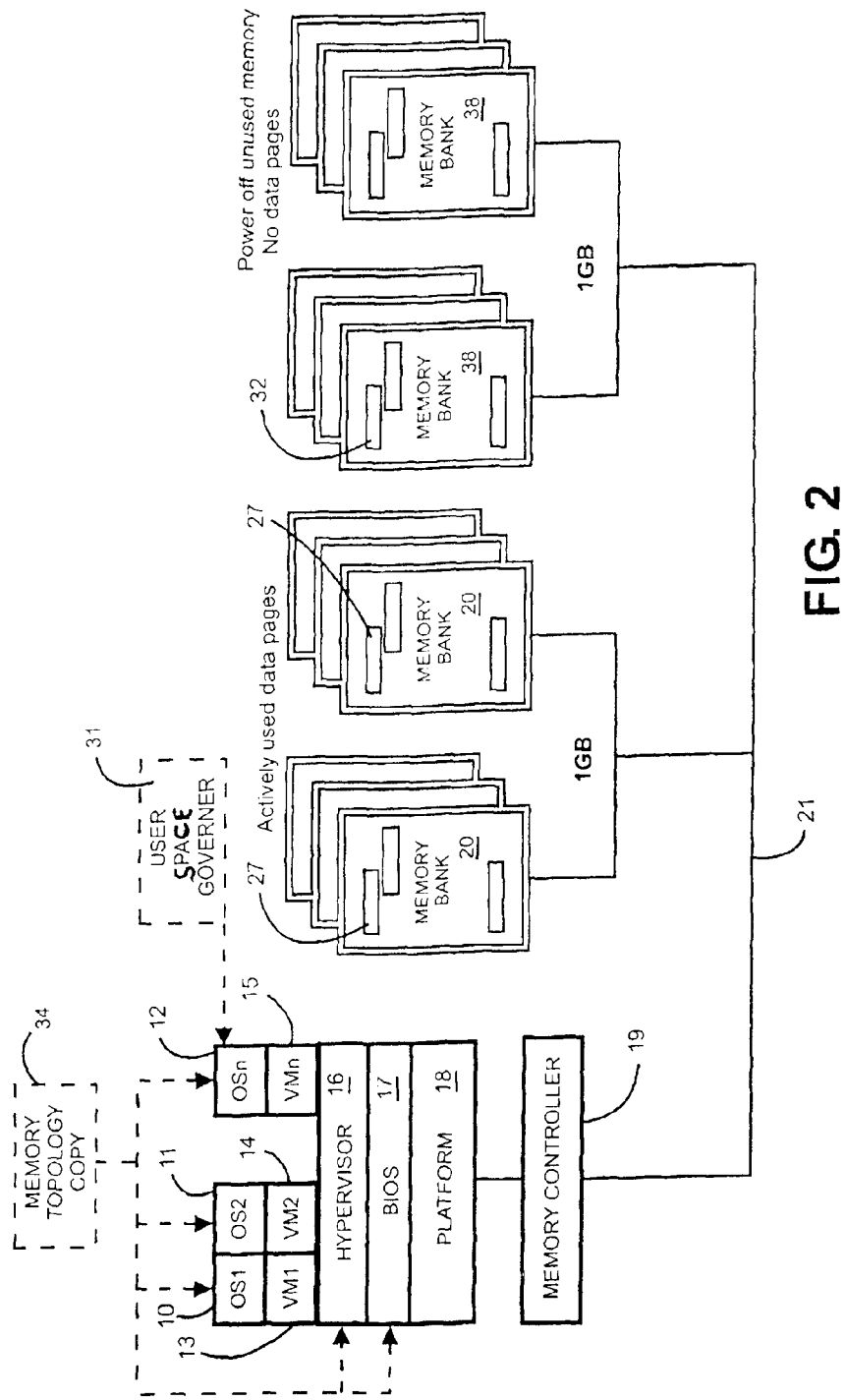
FIG. 2 is a block diagram of a generalized portion of a virtual memory system according to the present invention showing a multicore virtual machine platform connected to virtual memory through a memory controller.

Now with reference to FIG. 2, there is shown a generalized portion of a virtual memory system according to the present invention showing a multi-core virtual machine platform connected to virtual memory through a memory controller not unlike that of FIG. 1, with the enhancements of the present invention. Access to copies of the memory topology copies 34 i.e. the topology of banks 20 and 38 is provided to operating systems OS1, OS2 and OSn of operative virtual machines VM1, VM2, and VMn. Also, the operating systems each have a user space governor 31 which, as will be hereinafter described, set and determine the power consumption levels above which particular power reduction steps may be taken through the clearing of memory banks so as to evacuate their memory domains.

Once evacuated, memory banks and domains may be put in a very low power consumption mode including modes wherein power is completely turned off. This may be done exclusively by the memory controller when there is no memory reference for a given period of time to a particular memory bank. In addition, the present invention provides for controlling the memory controller 19 to evacuate memory banks through commands from hypervisor 16 based upon the interaction of hypervisor 16 with any of the virtual machine OS's 10, 11 or 12. This is made possible because a copy of the memory topology is provided to OS's 10, 11, and 12 and to hypervisor 16.

Thus, when monitored power consumption reaches a point wherein memory banks have to be evacuated, this invention provides two methods: either OS-directed or hypervisor-directed in order to attain the status shown in FIG. 2 wherein memory domain 32 of banks 38 is in a power-off state of unused memory with no data pages. However, it should be understood that memory power consumption may be selectively reduced to the various levels that will be hereinafter described with respect to FIG. 3.

In the OS-directed method, when a point is reached wherein the monitored power consumption level of a memory reaches a maximum power consumption predetermined point above which memory power consumption level is to be dynamically reduced, the selected virtual machine OS which is to control, starts to free up unused memory pages. Then the OS directs the swapping out of memory pages. This swapping out is directed with the purpose of freeing up memory power domains. This domain could be the whole memory domain controlled by the controller or a smaller memory power domain rank. These are evacuated in full. The choice of memory pages may be based on the least recently used (LRU) protocols by the OS. After the last page is freed in a power domain or before the first page is allocated from it, the controlling OS calls back hypervisor 16 to inform the hypervisor when to power on/off a domain. Once a power domain is evacuated, call backs from the directing OS issue a hypercall to tell hypervisor 16 that a particular power domain has been evacuated and the contents are not needed. However, the OS 12 accounts for the memory as being available for allocation. Therefore, hypervisor 16 does not reclaim the memory for allocation to another virtual machine VM. Instead, the evacuated memory remains in a new state: "inactive" 32, FIG. 2, until a guest OS starts to allocate again from the powered-off domain 32.

In the hypervisor-directed method, the hypervisor 16 tracks the memory topology 39 and advises the appropriate operating system 12 as to which memory bank 38 to evacuate. If needed, the OS 12 may issue a hypercall to the hypervisor 16 for a list of memory blocks to evacuate so that the power domain may be evacuated most effectively. The hypervisor dynamically sorts the list to achieve optimum evacuation, i.e. the optimum sequence of memory blocks to evacuate. In doing so the hypervisor may use the following protocols. The memory blocks may be evacuated on the basis of unallocated memory blocks in the various power domains. The evacuation in a particular domain may be based on the hypervisor by ranking the memory blocks on reference counts if facilities are available to perform such counts. Otherwise, all memory in the most recent power domain selected for evacuation will have the same evacuation priority. The OS 12 may provide specific requests or hints to the hypervisor as to special circumstances to modify these evacuation procedures.

Figure 3:
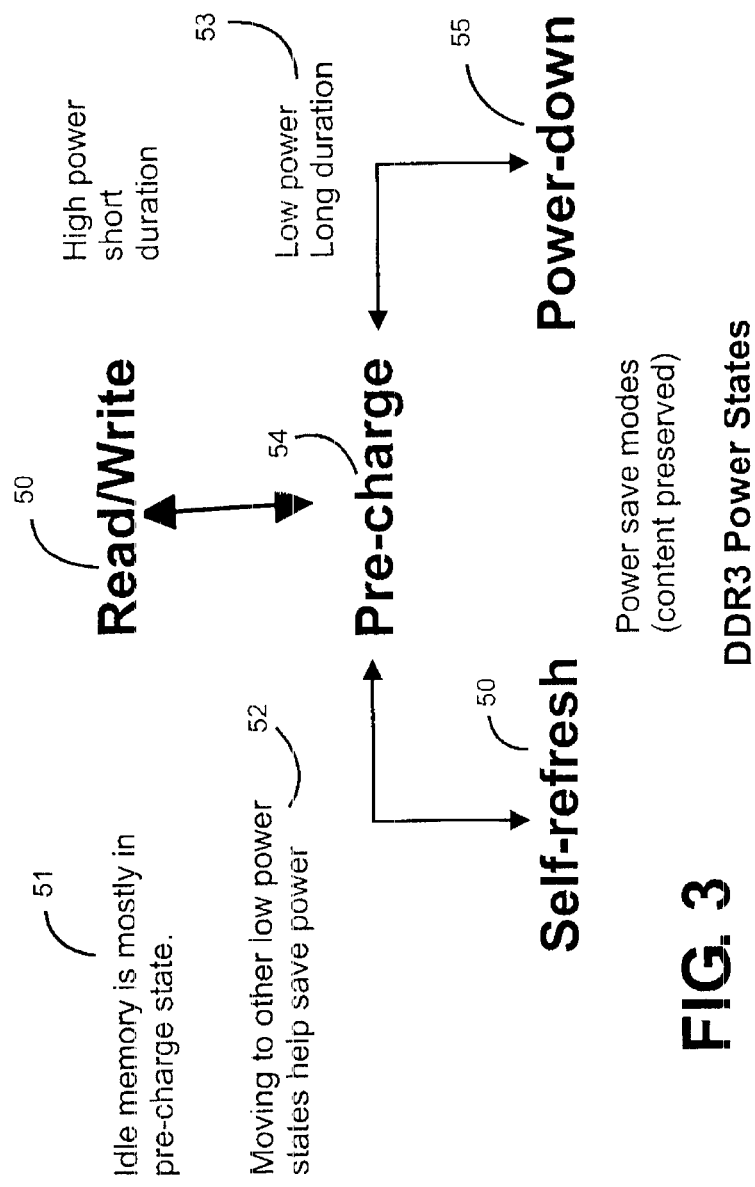
FIG. 3 is an illustrative chart showing the levels of power consumption that memory domains may be reduced to optimized power consumption.

While the virtual memory system of FIG. 2 results in the full power turn-off of the evacuated domains, power may also be saved using the OS/hypervisor methods described with respect to FIG. 2 for just reducing domain power consumption states to the next lowest level or rank listed in the chart of FIG. 3 showing power consumption rankings within a DDR3 memory. During Read/Write 50 stages, usually of short duration, High Ppower is required. However, during the prevalent idle 51 stages in memory, the memory banks and memory domains are in a precharge stage from which the method of the present invention may be applied to move banks and domains into lower power consumption stages 52 to reduce power consumption. Thus, if the precharge state is found to be of relatively long duration 53, then memory banks and domains are reduced from precharge 54 to full power down 55. If the period of precharge is to be relatively short, then banks and domains may still be reduced into self-refresh power level 56, wherein memory content is preserved.

It should be noted that CPU utilization can also be monitored and used as an input to evacuate memory power domains so as to minimize the performance impact and maximize idle power savings. Thus, CPU utilization can be an additional input to previously described user space governor 31.

Figure 4:
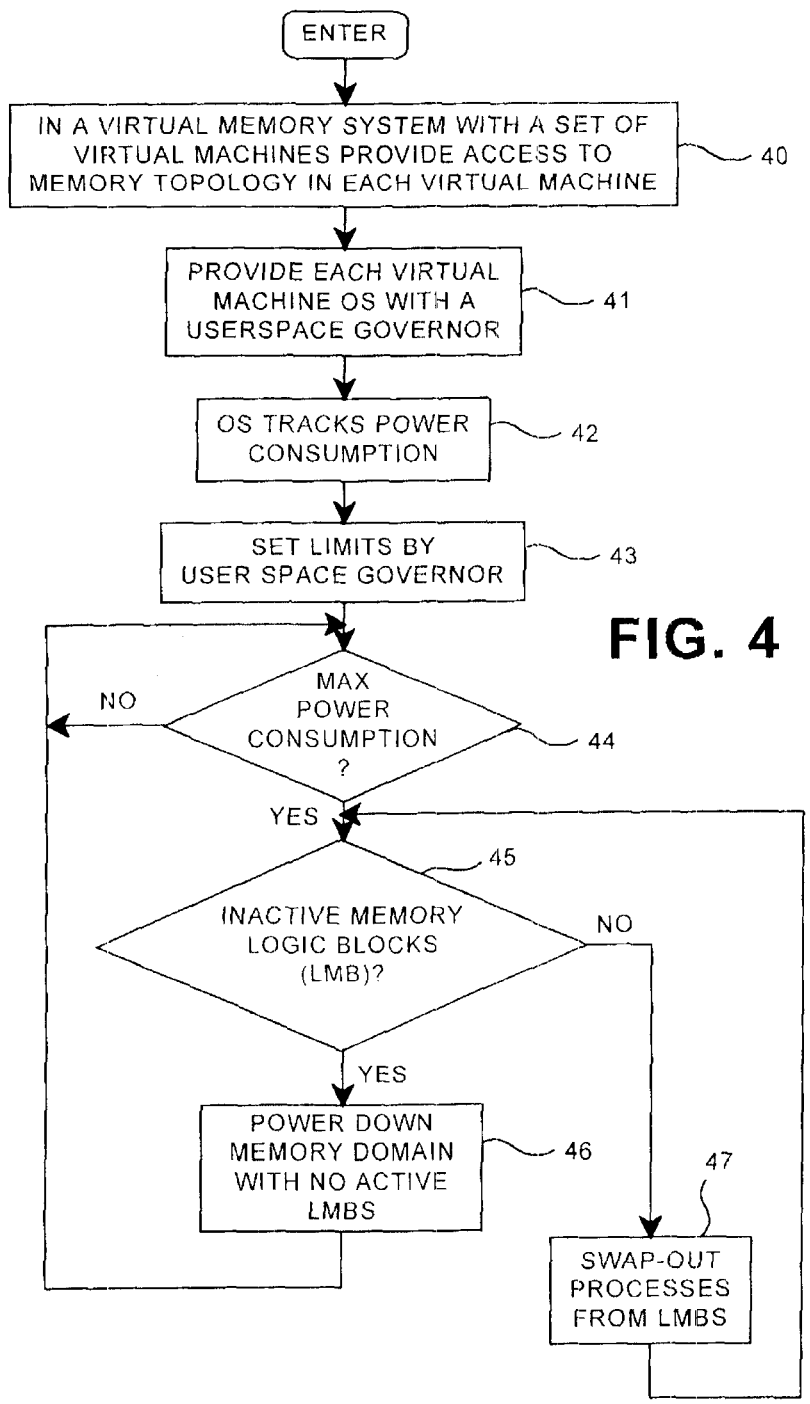
FIG. 4 is an illustrative flowchart of the running of a computer program according to the present invention using a user space governor in the operating system in the control of evacuating memory domains to reduce power consumption.

Referring now to FIG. 4, there is shown an illustrative flow chart of the running of a computer program according to the present invention using a userspace governor in the operating system in the control of evacuating of memory domains to reduce power consumption. As previously described with respect to FIG. 2, a userspace governor is available on each VM OS 10, 11, and 12. Assuming that the userspace governor 31 is functioning in OS 12, then with respect to FIG. 2, with a userspace governor in each OS step 41. The OS tracks power consumptions, step 42. The OS sets predetermined limits, e.g. the maximum power consumption in a domain at which the power reduction steps of the present invention start to be put into effect, step 43. A determination is made step 44 as to whether this maximum power consumption has been reached, step 44. If Yes, then a further determination is made as to whether there are inactive logical memory blocks (LMB), step 45. If Yes, domains with no active LMBs are powered down, step 46, and the process is returned to step 44. If the decision in step 45 is No, there are no inactive LMBs, then processes from LMBs are swapped out, step 47, and the process is returned to step 45 where a new determination is made as to whether there are now inactive LMBs, and steps 45, 46, and 47 are continued.

It should be noted that even if a maximum power threshold is not reached, some power domains that are automatically evacuated during normal system processing will remain still scheduled for power savings. Based upon the determined power threshold pages should be aggressively swapped out or reclaimed to further reduce power.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other device to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for reducing virtual memory power consumption during idle states in virtual memory systems comprising:
    tracking a system memory topology by a system hypervisor;
    tracking the topology of the system memory by a plurality of operating systems, each running on one of a plurality of virtual machines hosted by said system hypervisor;
    selecting one of said virtual machine operating systems to control the memory system;
    continuing to track the system memory topology on the unselected virtual machines;

dynamically monitoring idle states in the system memory; and dynamically reducing power consumption states in the system memory through the interaction of said hypervisor and said operation system running on said selected virtual machine.

2. The method of claim 1, further including, under control of said selected virtual machine operating system:

swapping out user processes to free up memory pages in a power domain to evacuate a memory power domain; and notifying the hypervisor that the power domain is evacuated, wherein said hypervisor may reduce power consumption of said power domain to a reduced state.

3. The method of claim 2 wherein said power domain is reduced to an inactive state.

4. The method of claim 2, further including under the control of said operating system:

setting a maximum power consumption level below which a userspace governor reduces the power consumption state only in power domains that automatically become evacuated during system operation; and above which power consumption level, said userspace governor seeks user processes that may be swapped out to evacuate power domains.

5. The method of claim 1, wherein:

the topology of the system memory is tracked by said hypervisor; and further including, under control of said hypervisor:

notifying the operating system of the selected virtual machine of the user processes to be swapped out so as to free up memory pages in a power domain to evacuate a memory power domain;

and reducing power consumption said power domain to a reduced state.

6. The method of claim 5, further including under the control of said selected virtual machine operating system:

setting a maximum power consumption level below which a userspace governor reduces the power consumption state only in power domains that automatically become evacuated during system operation; and above which power consumption level, said userspace governor seeks user processes which may be swapped out to evacuate power domains.

7. A virtual memory system for reducing power consumption during idle states in virtual memory comprising:

a processor;

a computer memory holding computer program instructions which when executed by the processor perform the method comprising:

tracking a system memory topology by a system hypervisor;

tracking the topology of the system memory by a plurality of operating systems, each running on one of a plurality of virtual machines hosted by said system hypervisor;

selecting one of said virtual machine operating systems to control the memory system;

continuing to track the system memory topology on the unselected virtual machines;

dynamically monitoring idle states in the system memory; and dynamically reducing power consumption states in the system memory through the interaction of said hypervisor and said operation system running on said selected virtual machine.

8. The system of claim 7, wherein:

the topology of the system memory is tracked by said operating system running on said selected virtual machine;

and further including, under control of said selected virtual machine operating system:

swapping out user processes to free up memory pages in a power domain to evacuate a memory power domain; and notifying the hypervisor that the power domain is evacuated, wherein said hypervisor may reduce power, consumption of said power domain to a reduced state.

9. The system of claim 8 wherein said power domain is reduced to an inactive state.

10. The system of claim 8, wherein said performed method under the control of said operating system further includes:

setting a maximum power consumption level below which a userspace governor reduces the power consumption state only in power domains that automatically become evacuated during system operation; and above which power consumption level, said userspace governor seeks user processes which may be swapped out to evacuate power domains.

11. The system of claim 7, wherein:

the topology of the system memory is tracked by said hypervisor; and said performed method further includes under control of said hypervisor:

notifying the operating system of the selected virtual machine of the user processes to be swapped out so as to free up memory pages in a power domain to evacuate a memory power domain;

and reducing power consumption of said power domain to a reduced state.

12. The system of claim 11, wherein said performed method, under the control of said selected virtual machine operating system, further includes:

setting a maximum power consumption level below which a userspace governor reduces the power consumption state only in power domains that automatically become evacuated during system operation; and above which power consumption level, said userspace governor seeks user processes which may be swapped out to evacuate power domains.

13. A computer usable non-transitory storage medium having stored thereon a computer readable program for reducing power consumption during idle states in a virtual, memory system, wherein the computer readable program when executed on a computer causes the computer to:

track a system memory topology by a system hypervisor;

track the topology of the system memory by a plurality of operating systems, each running on one of a plurality of virtual machines hosted by said system hypervisor;

select one of said virtual machine operating systems to control the memory system;

continue to track the system memory topology on the unselected virtual machines;

dynamically monitor idle states in the system memory; and dynamically reduce consumption states in the system memory through the interaction of said hypervisor and said operation system running on said selected virtual machine.

14. The computer usable storage medium of claim 13, wherein
the topology of the system memory is tracked by said operating system running on said selected virtual machine;
and said computer program, when executed, further causes the computer, under control of said selected virtual machine operating system, to:
swap out user processes to free up memory pages in a power domain to evacuate a memory power domain; and
notify the hypervisor that the power domain is evacuated, wherein said hypervisor may reduce power consumption of said power domain to a reduced state.

15. The computer usable storage medium of claim 14 wherein said power domain is reduced to an inactive state.

16. The computer usable medium of claim 14, wherein said computer program when executed further causes the computer, under the control of said operating system, to:
set a maximum power consumption level below which a userspace governor reduces the power consumption state only in power domains that automatically become evacuated during system operation; and
above which power consumption level, said userspace governor seeks user processes which may be swapped out to evacuate power domains.

17. The computer usable, storage medium of claim 13, wherein:
the topology of the system memo is tracked by said hypervisor; and
the computer program, when executed, under control of said hype visor further causes the computer to:
notify the operating system of the selected virtual machine of the user processes to be swapped out so as to free up memory pages in a power domain to evacuate a memory power domain;
and reduce power consumption of aid power domain to a reduced state.

18. The computer usable medium of claim 17, wherein said computer program when executed further causes the computer, under, the control of said selected virtual machine operating system, to:
set a maximum power consumption level below which a userspace governor reduces the power consumption state only in power domains that automatically become evacuated during system operation; and
above which power consumption level, said userspace governor seeks user processes which may be swapped out to evacuate power domains.

* * * * *